United States Patent
Boyd et al.

(10) Patent No.: US 12,291,623 B2
(45) Date of Patent: May 6, 2025

(54) ORGANICALLY MODIFIED CHALCOGENIDE POLYMERS

(71) Applicant: The Government of the United States of America, as represented by the Secretary of the Navy, Arlington, VA (US)

(72) Inventors: Darryl A. Boyd, Fort Washington, MD (US); Vinh Q. Nguyen, Fairfax, VA (US); Nia A. Pollard, Alexandria, VA (US); Frederic H. Kung, Alexandria, VA (US); Daniel J. Gibson, Cheverly, MD (US); Jason D. Myers, Alexandria, VA (US); Colin C. Baker, Alexandria, VA (US); Woohong Kim, Lorton, VA (US); Jasbinder S. Sanghera, Ashburn, VA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 268 days.

(21) Appl. No.: 17/855,021

(22) Filed: Jun. 30, 2022

(65) Prior Publication Data
US 2022/0332918 A1    Oct. 20, 2022

Related U.S. Application Data

(63) Continuation-in-part of application No. 17/110,687, filed on Dec. 3, 2020, now Pat. No. 11,827,008.

(60) Provisional application No. 63/216,587, filed on Jun. 30, 2021, provisional application No. 62/942,858, filed on Dec. 3, 2019.

(51) Int. Cl.
C08K 3/06 (2006.01)
C08F 12/36 (2006.01)
C08J 3/24 (2006.01)

(52) U.S. Cl.
CPC ............ *C08K 3/06* (2013.01); *C08F 12/36* (2013.01); *C08J 3/24* (2013.01)

(58) Field of Classification Search
CPC .............. C08K 3/06; C08F 12/36; C08J 3/24
See application file for complete search history.

(56) References Cited

U.S. PATENT DOCUMENTS

2017/0145167 A1* 5/2017 Baker ................ C08G 83/001

\* cited by examiner

*Primary Examiner* — Vishal I Patel
(74) *Attorney, Agent, or Firm* — US Naval Research Laboratory; Rebecca L. Forman

(57) ABSTRACT

A polymer comprising one or more chalcogenide elements and one or more crosslinking moieties. The crosslinking moieties may be organic, inorganic, or both. Also disclosed is the related method for making a polymer comprising purifying a chalcogenide polymer powder comprising one or more chalcogenide elements, melting the purified chalcogenide polymer powder, adding one or more crosslinking moieties to the melted chalcogenide polymer, and curing the modified chalcogenide polymer at a temperature between 150 and 200° C.

4 Claims, 4 Drawing Sheets

|  | I | II | III | IV |
|---|---|---|---|---|
| Visible | | | | |
| SWIR | | | | |
| MWIR | | | | |
| LWIR | | | | |

ORGANICALLY MODIFIED CHALCOGENIDE POLYMERS

PRIORITY CLAIM

The present application is a non-provisional application claiming the benefit of U.S. Provisional Application No. 63/216,587 filed on Jun. 30, 2021, by Darryl A. Boyd et al., entitled "ORGANCIALLY MODIFED CHALCOGENIDE POLYMERS." The present application is also a continuation-in-part application claiming the benefit of U.S. application Ser. No. 17/110,687 filed on Dec. 3, 2020 by Darryl A. Boyd et al., entitled "ORGANICALLY MODIFIED CHALCOGENIDE POLYMERS FOR USE AS OPTICAL ADHESIVE MATERIALS," which was a non-provisional application claiming the benefit of U.S. Provisional Application No. 62/942,858 filed on Dec. 3, 2019, by Darryl A. Boyd et al., entitled "ORGANICALLY MODIFIED CHALCOGENIDE POLYMERS FOR USE AS OPTICAL ADHESIVE MATERIALS," the entire contents of all of these applications are incorporated herein by reference.

FEDERALLY-SPONSORED RESEARCH AND DEVELOPMENT

The United States Government has ownership rights in this invention. Licensing inquiries may be directed to Office of Technology Transfer, US Naval Research Laboratory, Code 1004, Washington, D.C. 20375, USA; +1.202.767.7230; techtran@nrl.navy.mil, referencing 210331-US1.

BACKGROUND

Infrared transmitting optical materials are necessary to attain thermal images. This allows for visualization of objects in low-light conditions. The ranges in which thermal imaging can occur includes the long-wavelength infrared (LWIR) range (8-14 µm). Materials that can achieve transmission in the LWIR range tend to be made from glass materials (e.g. chalcogenide glass). Despite their advantageous optical transmission, these glass materials are heavy, costly, and are fabricated at extremely high temperatures (e.g., >600° C.).

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments described herein are directed to the use of chalcogenide-based, inorganic-organic polymers as LWIR-transmitting materials. These chalcogenide polymers are lightweight, cheap to make, and can be fabricated at temperatures less than 200° C. These polymers possess high refractive indices (e.g., n>1.7) and useful optical transmission at LWIR wavelengths. The transmission obtained in these materials far exceeds the transmission that is typically seen in optical polymers. Furthermore, the properties of the chalcogenide polymer can be tailored by adjusting the composition of the polymer (e.g., crosslinker/chalcogenide ratio, chalcogen element, crosslinker molecule) to achieve optical transmission at specific wavelengths.

BRIEF DESCRIPTION OF THE DRAWINGS

FIG. 2 depicts images taken in various wavelength ranges for various chalcogenide polymers.

Figure 1:
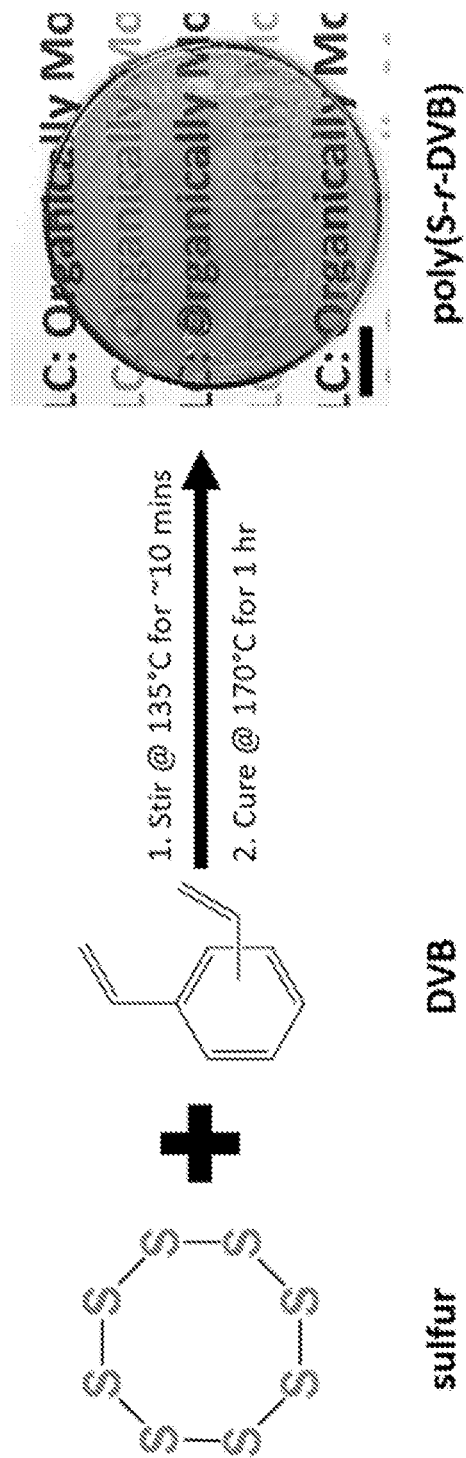
FIG. 1 depicts a reaction scheme for synthesis of poly(S-r-DVB) chalcogenide polymer.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

Introduction

References in the specification to "one embodiment," an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, it is submitted that it is within the knowledge of one skilled in the art to effect such feature, structure, or characteristic in connection with other embodiments whether or not explicitly described.

It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Terminology

The terminology used in the specification is for the purpose of describing particular embodiments, and is not intended to be limiting. In the description of the embodiments and the claims, the following terminology will be used in accordance with the definition set out below.

As used herein, the singular forms "a," "an," and "the" do not preclude plural referents, unless the content clearly dictates otherwise.

As used herein, the term "and/or" includes any and all combinations of one or more of the associated listed items.

As used herein, the term "about" when used in conjunction with a stated numerical value or range denotes somewhat more or somewhat less than the stated value or range, to within a range of ±10% of that stated.

Terminology used herein should not be construed as being "means-plus-function" language unless the term "means" is expressly used in association therewith.

Example Embodiments

Thermal imaging is a means by which warm-body objects can be detected in low-light conditions. Obtaining thermal images is only possible through materials that have transmission capabilities at infrared wavelengths. Embodiments are described herein that are directed to the fabrication and use of inorganic-organic polymers as long-wavelength infrared (LWIR) transmissive polymers. These polymers are composed of chalcogenide elements such as sulfur and selenium, along with organic and/or inorganic crosslinking moieties that aid in determining thermal, mechanical and optical properties. These optical materials possess ultra-high refractive indices and are uniquely suitable for optical applications in the LWIR region, but are also useful in other optical transmission regions. The properties of this optical adhesive material can be controlled by exploiting both the inorganic and organic components.

FIG. 1 depicts a reaction scheme for synthesis of poly (S-r-DVB) chalcogenide polymer. In this embodiment, polycrystalline sulfur powder may be purified, resulting in sulfur with 99.999% purity. The solid polycrystalline sulfur may be heated to ~135° C., melting the sulfur. Polymers containing sulfur may be synthesized by adding a single or multiple isomers of divinylbenzene (referred to as DVB) comonomer to the molten sulfur at elevated temperature (>100° C.), and stirred for a short period of time (<10 min) in a container, preferably a non-stick container. The container may then be placed in a preheated furnace, and the product cured at high temperature (>150° C.). Finally, the container may be removed from the furnace to allow the polymer to cool and be extracted in freestanding form.

Figure 2:
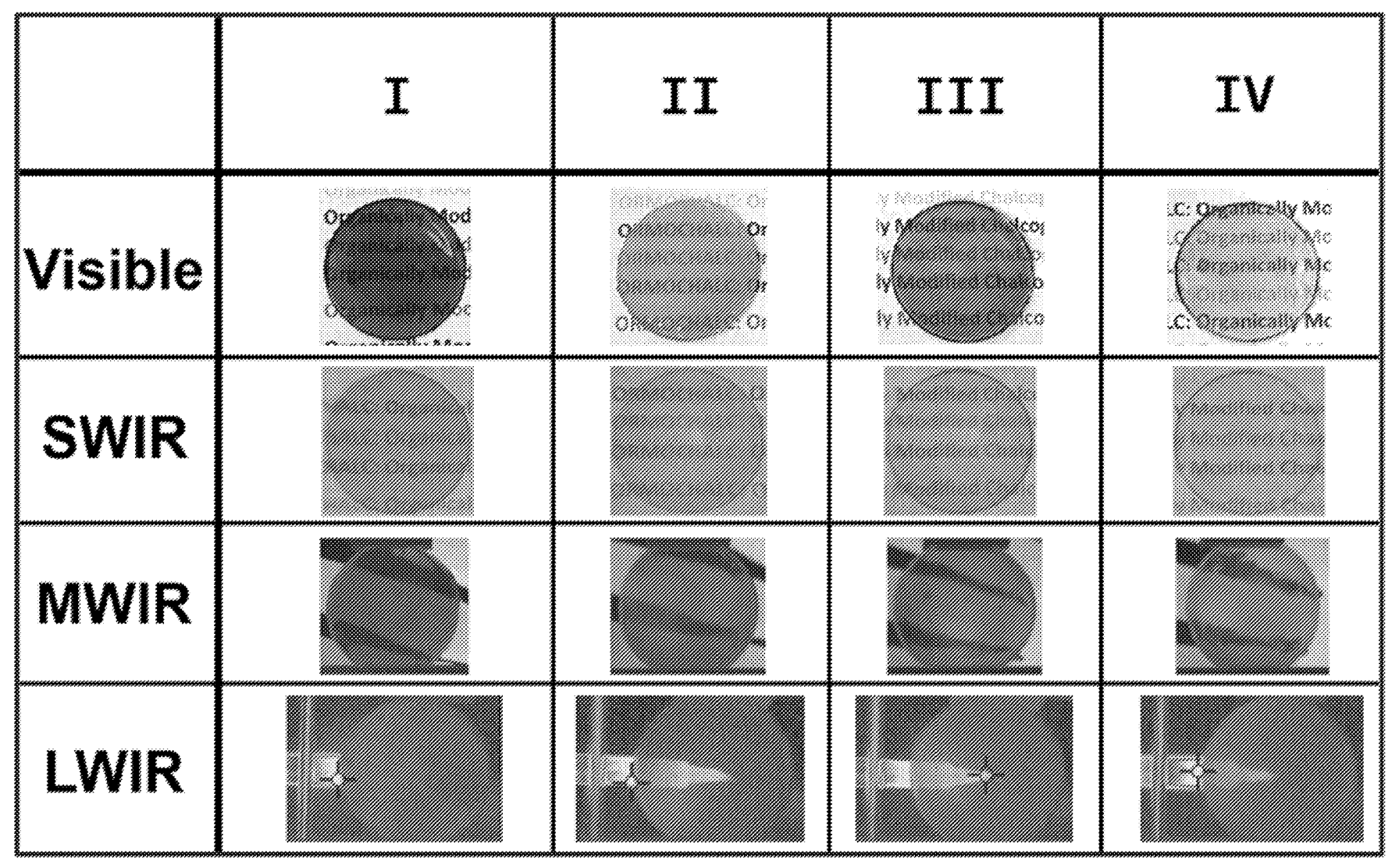

FIG. 2 depicts images taken in various wavelength ranges for various chalcogenide polymers. Following polymer formation, the chalcogenide polymers demonstrate transparency beginning in the visible wavelength range all the way through the LWIR range, even at thickness of 1 mm or greater, as shown in Table 1 below.

TABLE 1

Thicknesses of ORMOCHALC polymer specimens used for FTIR analyses.

| Comonomer | ORMOCHALC | Thickness (mm) |
|---|---|---|
| I | poly(S-r-DIB) | 1.65 |
| II | poly(S-r-m-DVB) | 1.00 |
| III | poly(S-r-p-DVB) | 1.10 |
| IV | poly(S-r-mixed-DVB) | 1.69 |

Figure 3:
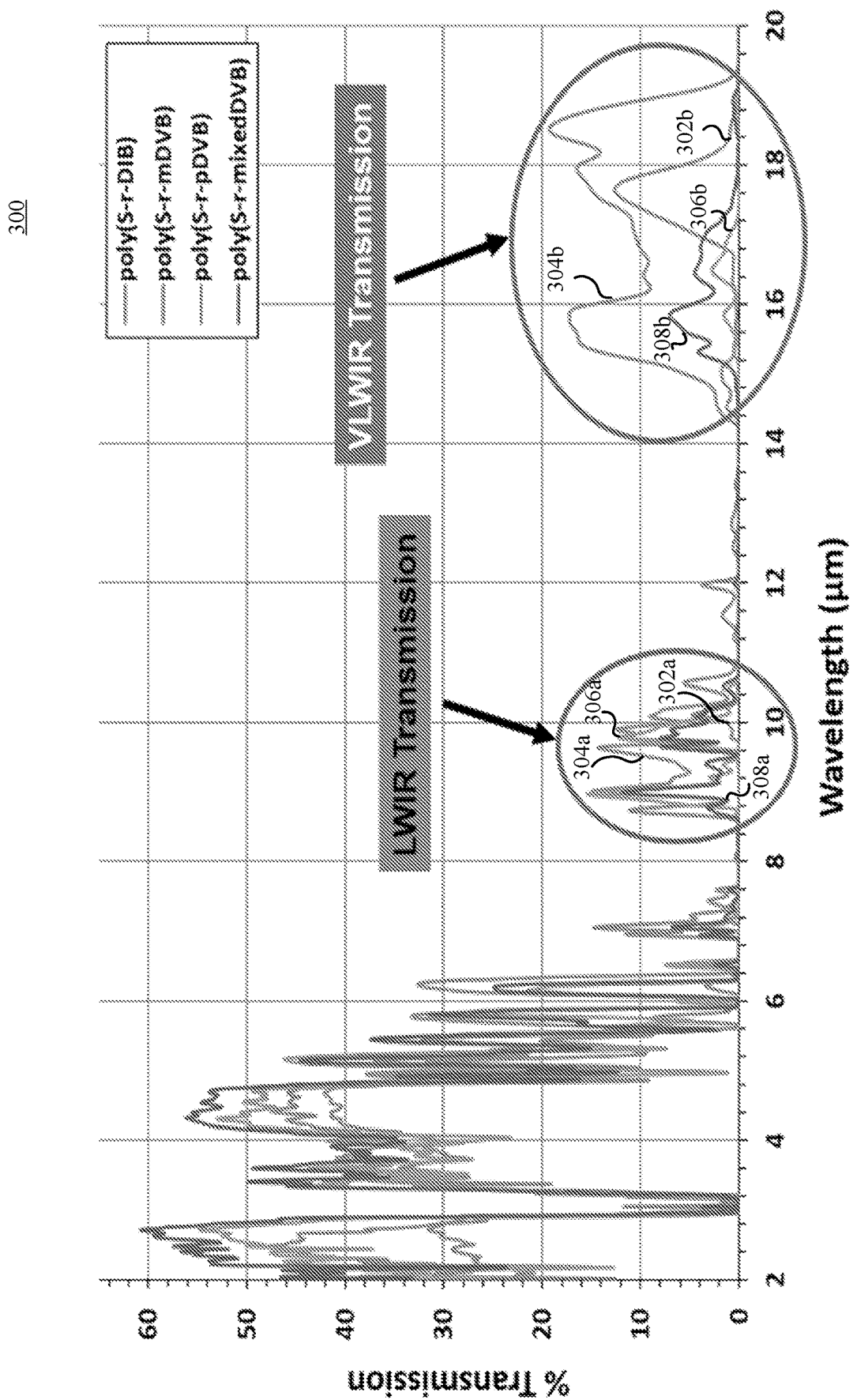
FIG. 3 depicts a plot of short-wavelength infrared (SWIR)-very long-wavelength infrared (VLWIR) spectrum for various chalcogenide polymers.

FIG. 3 depicts a plot 300 of SWIR-VLWIR transmission spectrum for various chalcogenide polymers. At the LWIR transmission, poly(S-r-DIB), poly(S-r-mDVB), poly(S-r-pDVB), and poly(S-r-mixedDVB) are respective shown as 302a, 304a, 306a, and 308a in FIG. 3. At the VLWIR transmission, poly(S-r-DIB), poly(S-r-mDVB), poly(S-r-pDVB), and poly(S-r-mixedDVB) are respective shown as 302b, 304b, 306b, and 308b in FIG. 3. Quantitative analysis confirms the chalcogenide polymers optical transmission, including transmission in the very long-wavelength infrared (VLWIR) range as shown in FIG. 3.

Figure 4:
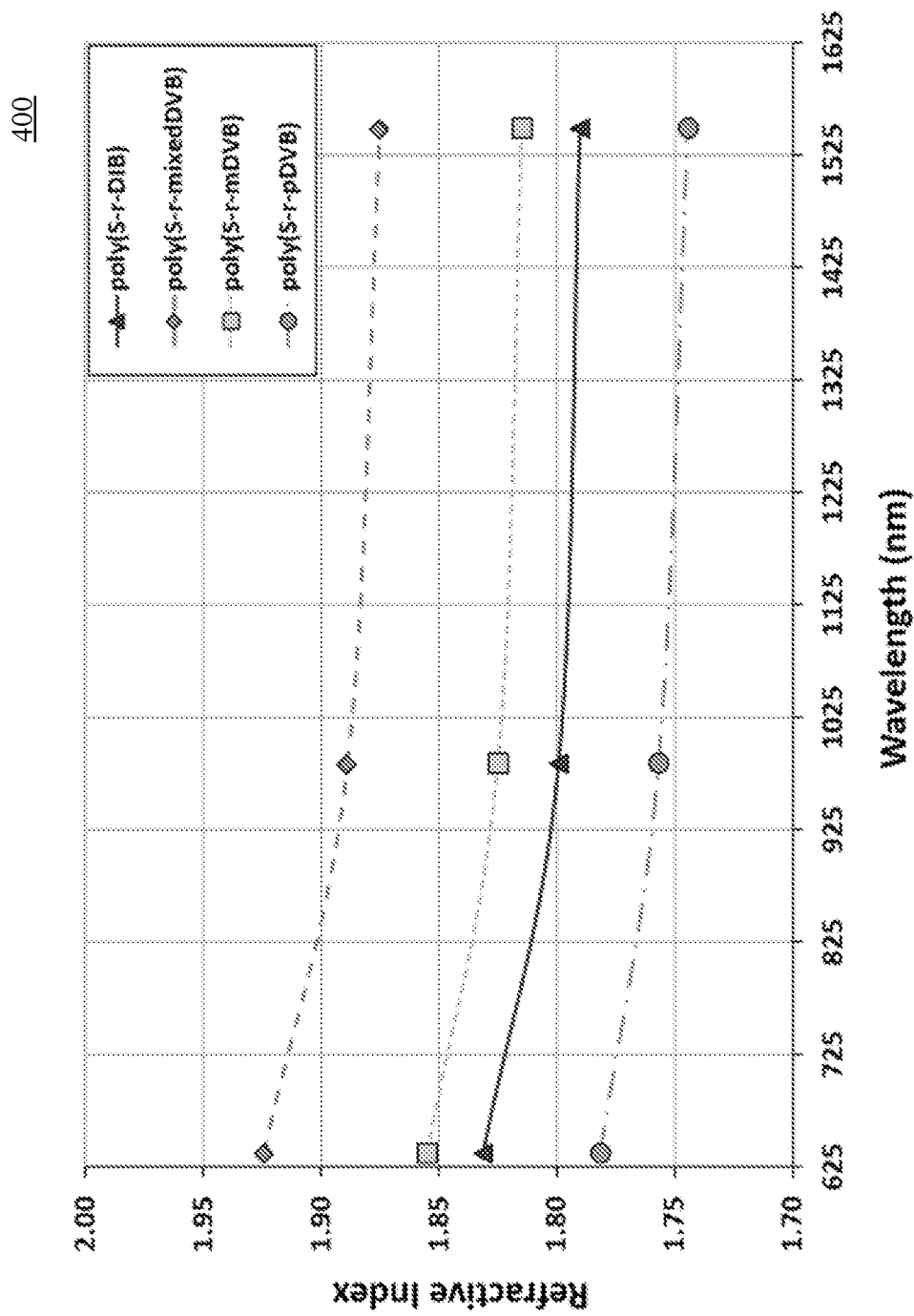
FIG. 4 depicts a plot of refractive indices of chalcogenide polymers at three different wavelengths.

FIG. 4 depicts a plot of refractive indices of chalcogenide polymers at three different wavelengths. DIB indicates 1,3-diisopropenyl benzene, mDVB indicates meta-divinylbenzene, pDVB indicates para-divinylbenzene, and mixed DVB indicates a mixture of meta- and para-divinylbenzene isomers. Lines are fits to the three discrete data points indicated in the plot. The chalcogenide polymers may exhibit ultra-high refractive indices (n>1.80).

The polymers may be fabricated in various embodiments, including as bulk films (>0.5 mm), thin films or fibers. The chalcogenide polymers may also be molded into various shapes and forms.

Advantages and New Features

The embodiments described herein provide a material with infrared transmission capability that extends beyond the transmission capability of common optical materials. The transmission capability extends from the visible to VLWIR. In addition, the material exhibits ultra-high refractive index.

Alternatives

In embodiments, selenium and/or tellurium may also be used in any percentage combination, with or without Sulphur. Other non-chalcogen elements, such as germanium, antimony or tin, may also be used in any percentage combination with chalcogen elements. Comonomers other than DVB may also be used in the fabrication process as comonomers. Mixtures of comonomers may also be used in the fabrication process. Parameters may vary, for example, the reaction temperature, reaction time length, and product cure time may vary. Non-thermal methods of curing may be employed to cure the chalcogenide polymer (e.g., UV irradiation, laser energy, individually or in combination). The ratio of chalcogen to comonomer may vary.

Conclusion

While various embodiments of the disclosed subject matter have been described above, it should be understood that they have been presented by way of example only, and not limitation. Various modifications and variations are possible without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A method for making a polymer, comprising:
purifying a chalcogenide polymer powder comprising one or more chalcogenide elements;
melting the purified chalcogenide polymer powder;
adding one or more crosslinking moieties to the melted chalcogenide polymer powder;
curing the modified chalcogenide polymer at a temperature between 150 and 200° C.; and
forming a polymer capable of achieving optical transmission in the long-wavelength infrared (LWIR) range from 8-14 μm.

2. The method of claim 1, wherein the one or more crosslinking moieties are organic.

3. The method of claim 1, wherein the one or more crosslinking moieties are inorganic.

4. The method of claim 1, wherein the one or more crosslinking moieties are both organic and inorganic.

* * * * *